(12) United States Patent
Makihara

(10) Patent No.: US 10,292,530 B2
(45) Date of Patent: May 21, 2019

(54) HEATING AND COOKING APPARATUS

(71) Applicant: A UTILITY TOOL CO., LTD., Tokyo (JP)

(72) Inventor: Katsunori Makihara, Tokyo (JP)

(73) Assignee: A UTILITY TOOL CO., LTD., Tokyo (JP)

( * ) Notice: Subject to any disclaimer, the term of this patent is extended or adjusted under 35 U.S.C. 154(b) by 0 days.

(21) Appl. No.: 15/570,336

(22) PCT Filed: May 13, 2016

(86) PCT No.: PCT/JP2016/064264
§ 371 (c)(1),
(2) Date: Oct. 31, 2017

(87) PCT Pub. No.: WO2016/186023
PCT Pub. Date: Nov. 24, 2016

(65) Prior Publication Data
US 2018/0353008 A1 Dec. 13, 2018

(30) Foreign Application Priority Data
May 15, 2015 (JP) .................. 2015-099608

(51) Int. Cl.
H05B 3/68 (2006.01)
H05B 3/06 (2006.01)
A47J 37/06 (2006.01)

(52) U.S. Cl.
CPC ......... *A47J 37/0676* (2013.01); *A47J 37/067* (2013.01)

(58) Field of Classification Search
CPC .......... A47J 37/00; A47J 37/04; A47J 37/041; A47J 37/06; A47J 37/0611; A47J 37/0617;
(Continued)

(56) References Cited

U.S. PATENT DOCUMENTS 3,586,825 A * 6/1971 Hurley .................. F24C 15/101
126/21 A
4,910,372 A * 3/1990 Vukich ................ H05B 6/1209
219/218
(Continued)

FOREIGN PATENT DOCUMENTS

JP 61-017706 Y2 5/1986
JP 64-014338 U 1/1989
(Continued)

OTHER PUBLICATIONS

International Preliminary Report on Patentability for PCT/JP2016/064264 dated Nov. 21, 2017.

Primary Examiner — Sang Y Paik
(74) Attorney, Agent, or Firm — Bruzga Patent Law Firm; Shlomo S. Moshen

(57) ABSTRACT

A heating and cooking apparatus is provided that can produce a place for all-participating-type cooking. The electric griddle 100 mainly includes an iron plate section 110 having a high thermal conductivity, a glass section 120 having a low thermal conductivity, a heating material 130 as a heat source, a heat insulating mechanism 140, and an outer frame 150. On the glass section 120, it is possible to place dishes and bowls on which food ingredients and the like can be placed in the glass part 120, and to place food ingredients there directly. Thus, it is possible to prevent food ingredients and the like from being placed only in the hands of a specific person, to realize a situation which many people can easily cook, and to produce a place for all-participating-type cooking.

16 Claims, 11 Drawing Sheets

(58) Field of Classification Search
CPC ............ A47J 2037/0617; A47J 37/0623; A47J 37/0629; A47J 37/067; A47J 37/0676; H05B 3/68; H05B 3/688
USPC .......................... 219/443.1–468.2, 524, 525
See application file for complete search history.

(56) References Cited

U.S. PATENT DOCUMENTS

| | | | | |
|---|---|---|---|---|
| 5,077,460 A | * | 12/1991 | Rocha | A47J 36/2483 219/217 |
| 2009/0205626 A1 | * | 8/2009 | Ferreiro Cerceda | A47J 33/00 126/25 A |

FOREIGN PATENT DOCUMENTS

| | | |
|---|---|---|
| JP | 01-012679 Y2 | 4/1989 |
| JP | 3011414 U | 5/1995 |
| JP | 08-135986 A | 5/1996 |
| JP | 09-056602 A | 4/1997 |
| JP | 2002-153386 A | 5/2002 |

* cited by examiner

[Fig. 1]
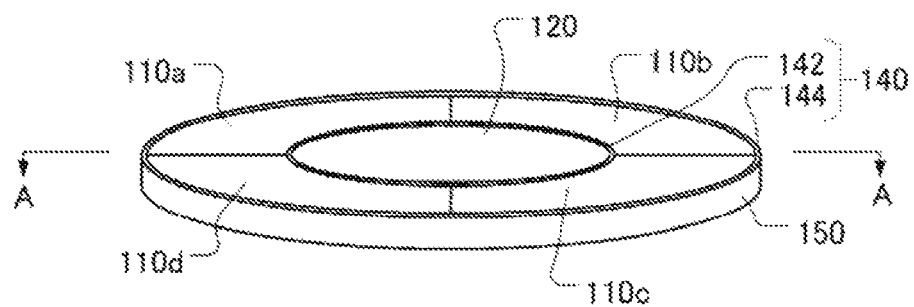

[Fig. 2]
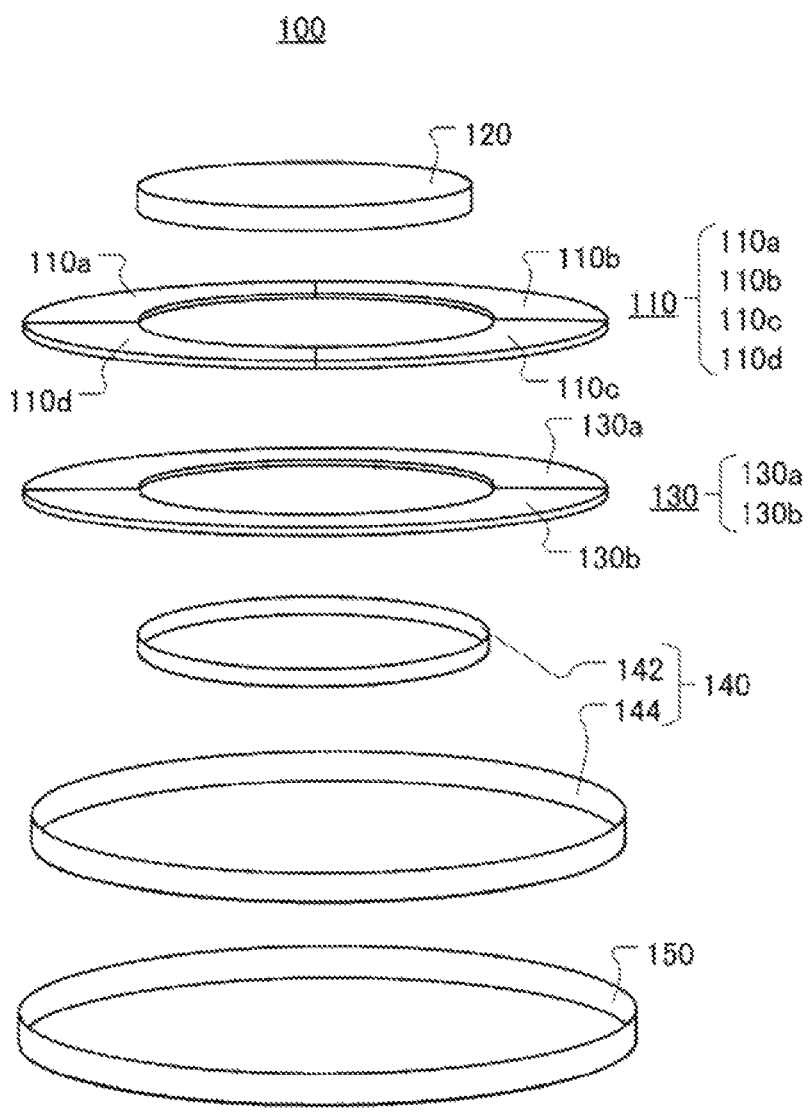

[Fig. 3]
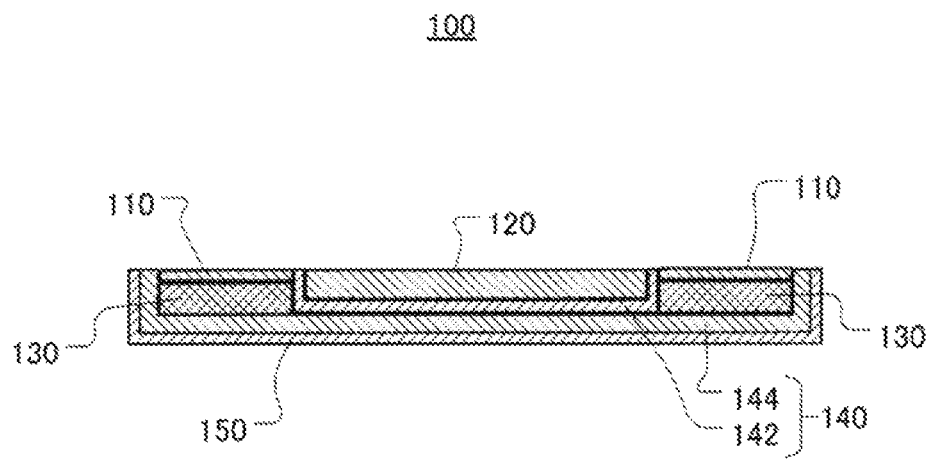

[Fig. 4]
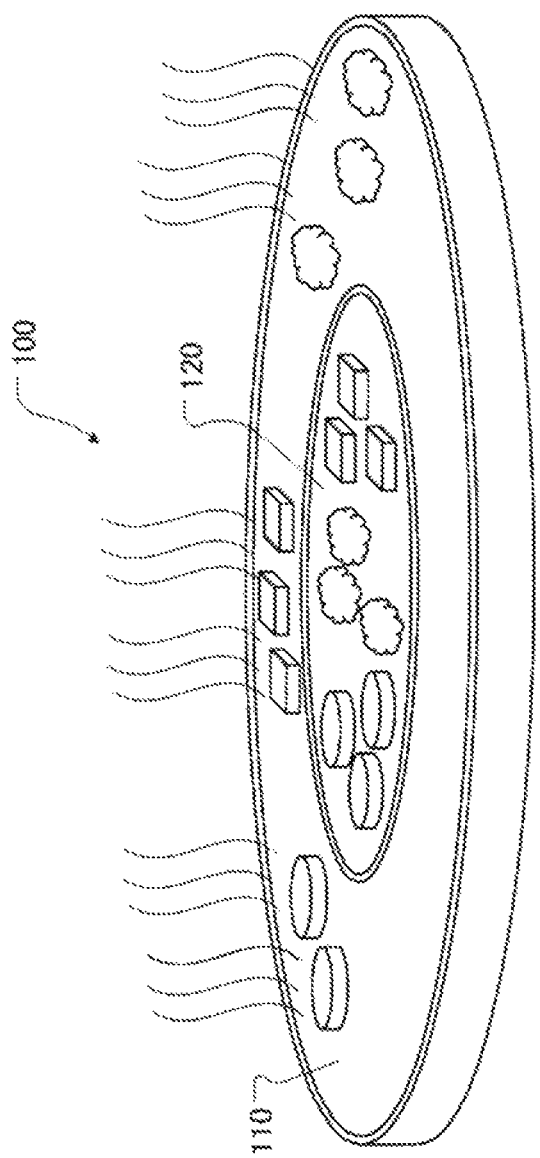

[Fig. 5]
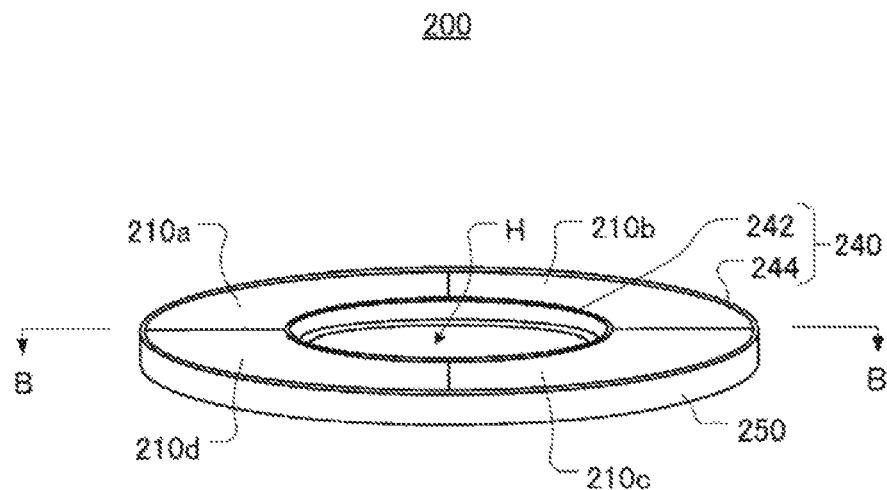

[Fig. 6]
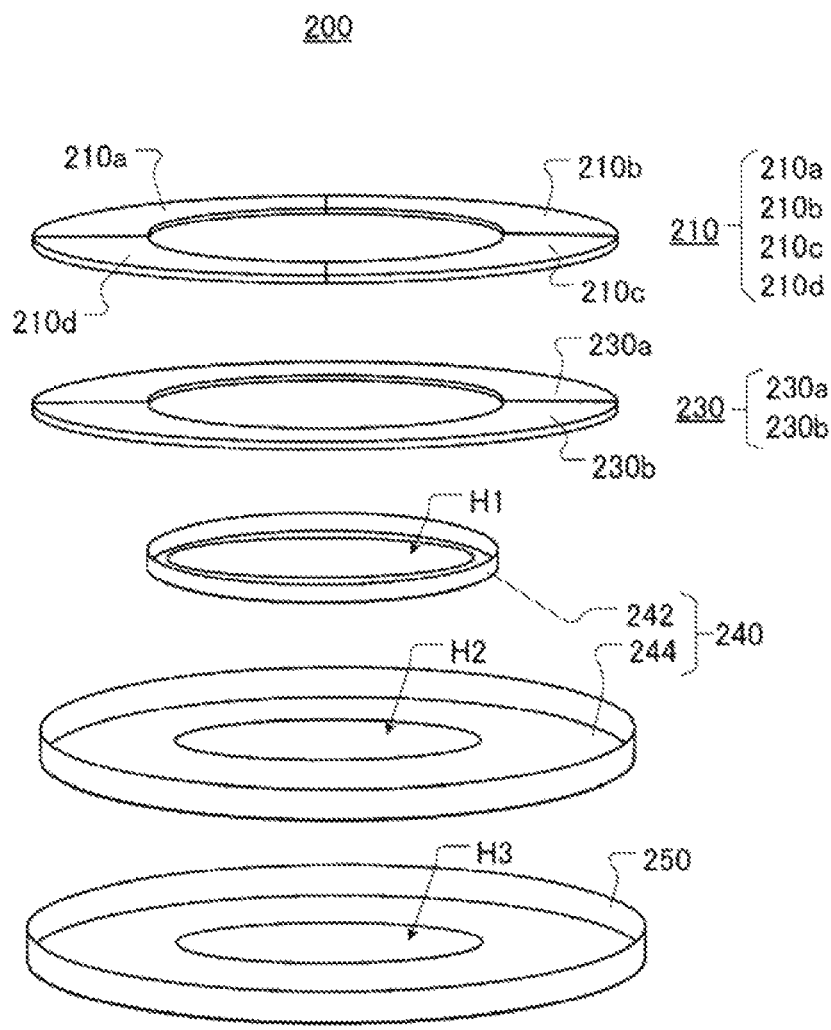

[Fig. 7]
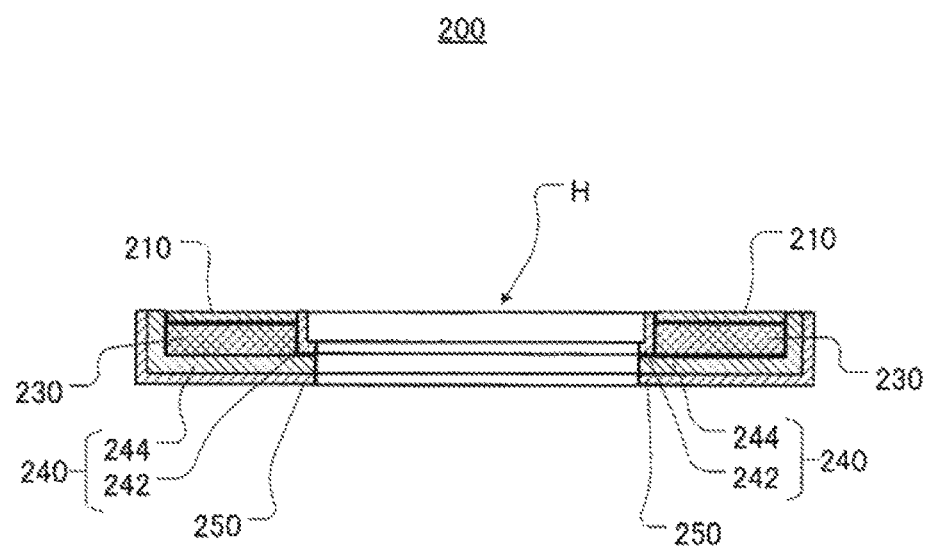

[Fig. 8]
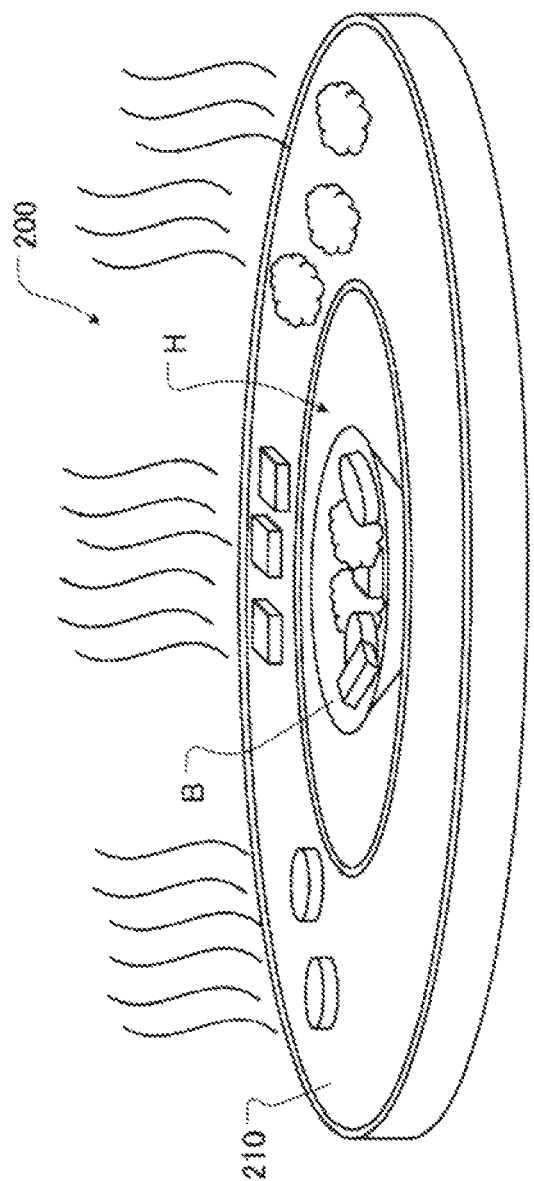

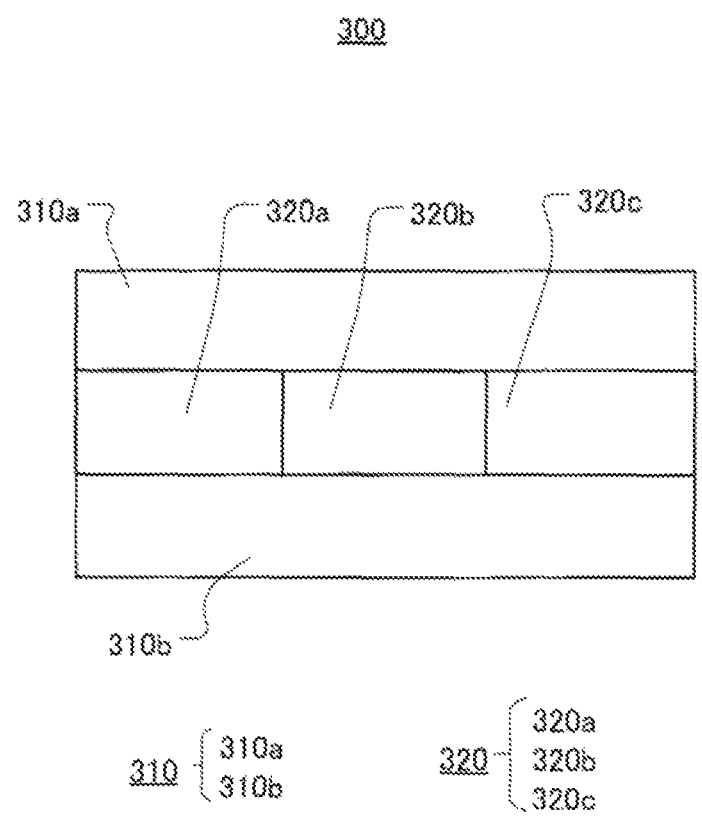
[Fig. 9]

[Fig. 10]
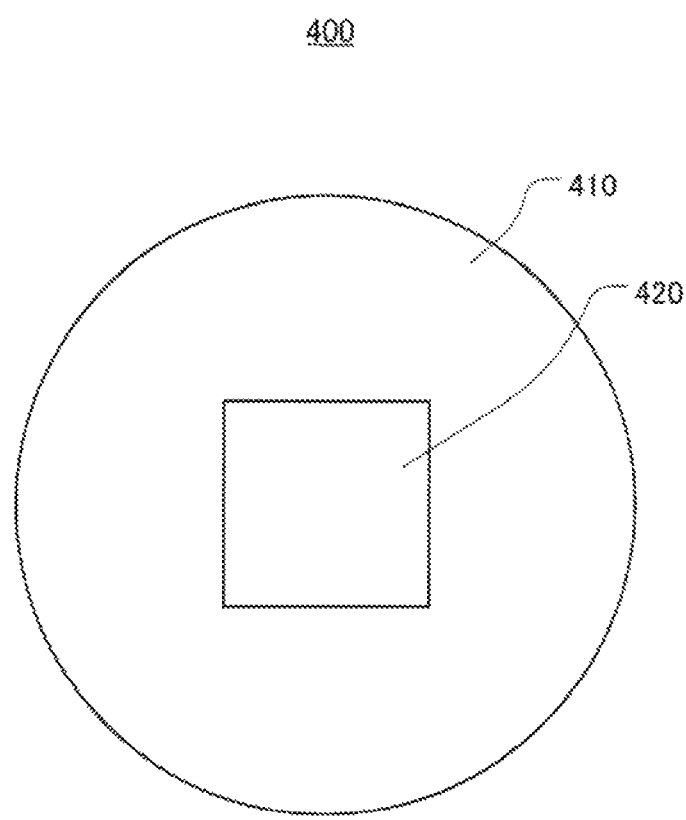

[Fig. 11]
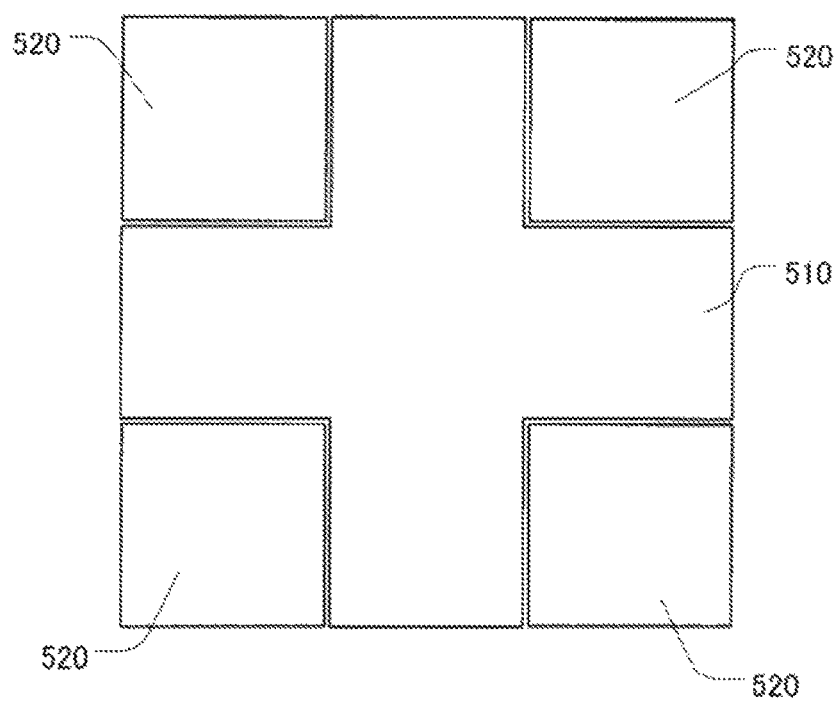
[Fig. 12]
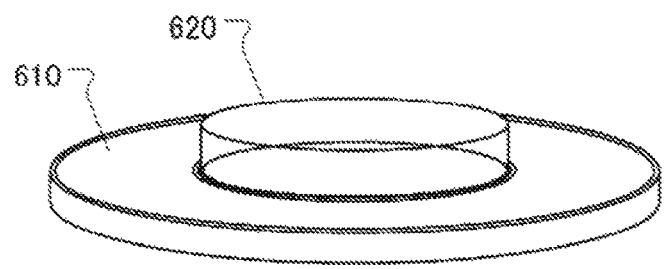

HEATING AND COOKING APPARATUS

FIELD OF THE INVENTION

The present invention relates to a heating and cooking apparatus whose cooking surface is heated by a heat source.

BACKGROUND OF THE INVENTION

An electric griddle is known as one of the heating and cooking apparatuses whose cooking surface are heated by a heat source such as electricity or magnetism. Conventionally, a place of all-participating-type cooking by all participants eating at the same table with the griddle is assumed and expected at the place of the griddle is used. (See Patent Literature 1.) Based on such assumption and expectation, a conventional electric griddle is placed in the center of the table and ingredients, dishes and bowls are placed near a person leading the cooking.

CITATION LIST

Patent Literature

Patent Literature 1

Japanese Patent Laying-Open No. 2002453386

SUMMARY OF THE INVENTION

Technical Problem

However, only the person leading the cooking often cooks with the conventional electric griddle because of its physical structure. As a result, the other participants will only eat cooked meals. If there are four people, three of them only watch the process of cooking and eat cooked meals served by the person leading the cooking.

It is almost same as usual meal without an electric griddle. The cooking place has just been moved from the kitchen to the dining table. It is no longer all-participating-type cooking. On the contrary, it takes more time to cook. As a result, users do not find the meaning of an electric griddle and seldom use it. Such a problem is not only related to an electric griddle but also all cooking apparatuses for all-participating-type cooking.

To solve the above problem, it is an object of the present invention to provide a new and improved heating and cooking apparatus which is possible to produce a place for all-participating-type cooking.

Solution to the Problem

To solve the above problem, according to first aspect of the present invention, it is an object of the present invention to provide a heating cooking apparatus including following components;
  a first member,
  a second member made of the same or different material as the first member,
  a heat source for heating the first member,
  an outer frame that houses the first member, the second member, and the heat source,
  a first heat insulating mechanism provided between the second member, and the first member and the heat source,
  and a second heat insulating mechanism provided between the entire bottom surface of the second member, the entire bottom surface of the heat source, the first member and the heat source, and the outer frame.

The heat source may be disposed only in a part corresponding to the first member. In addition, the first member and the second member may be flush to each other. Still more, the outer shape of the first member may be a polygonal shape or a circular shape and the second member may be disposed in a part including the central part of an outer shape of the first member. Furthermore, the first member may be separable into a plurality of surfaces.

To solve the above problem, according to second aspect of the present invention, it is an object of the present invention to provide a heating cooking apparatus in which a cooking surface is heated by a heat source, and the cooking surface includes a first area made of a first material and a second area made of a second material having a thermal conductivity lower than that of the first material.

Such constitution of thermal conductivity is enough to place dishes and bowls on which food ingredients and the like can be placed on this second area, and to place food ingredients there directly. Thus, it is possible to prevent food ingredients and the like from being placed only in the hands of a specific person, to realize a situation in which many people can easily cook, and to produce a place for all-participating-type cooking.

To solve the above problem, according to third aspect of the present invention, it is an object of the present invention to provide a heating cooking apparatus in which a cooking surface is heated by a heat source, and the surface is composed of a first area and a second area, and heat insulating mechanisms are provided between the first area and the second area and between the second area and the heat source.

Such constitution of a heat insulating mechanism provided around the second area is enough to place dishes, bowls, or ingredients directly on this second area. Thus, it is possible to prevent food ingredients and the like from being placed only in the hands of a specific person, to realize a situation in which many people can easily cook, and to produce a place for all-participating-type cooking.

This invention allows the first area to be formed of a first material, and the second area to be formed of a second material having a lower thermal conductivity than that of the first material. Thus, the temperature rise in the second area can be further suppressed.

The heat source may be disposed only in a part corresponding to the first area. The temperature rise in the second area can be further suppressed by disposing the heat source only at the part corresponding to the first area and not at the part corresponding to the second area.

The first area and the second area may be flush to each other. This can make it easy to move the ingredients from the second area to the first area and to cook them when the ingredients are placed directly on the second area. It is easy to wash and take care of, too. Furthermore, it is also possible to move the ingredients from the first area to the second area to prevent them from excessive heating.

The cooking surface may be a polygonal shape or a circular shape and the second area may be disposed in a part including the central part of the cooking surface. By disposing the second area in a part including the central part of the cooking surface, it is possible to place ingredients in the center of the cooking surface so that all the participants can easily take and cook them.

To solve the above problem, according to fourth aspect of the present invention, it is an object of the present invention to provide a heating cooking apparatus in which a cooking surface is heated by a heat source, and the cooking surface is a doughnut-shaped and the heat source is disposed only in a part corresponding to the doughnut-shaped cooking surface.

By making the cooking surface into a doughnut shape and by shaping the central part of the cooking surface like a hollow shape, such constitution of a doughnut-shaped cooking surface makes it possible to place dishes and bowls on which food ingredients and the like can be placed in a central part, and to place food ingredients there directly. Thus, it possible to prevent food ingredients and the like from being placed only in the hands of a specific person, to realize a situation in which many people can easily cook, and to produce a place for all-participating-type cooking.

In the present invention, the cooking surface may be separable in a plurality of surfaces. It is convenient for storage, care, or carrying.

Advantageous Effects of the Invention

This heating and cooking apparatus of the present invention makes it possible to produce a place of all-participating-type cooking. Other effects of the present invention are described in the following section: description of embodiments.

BRIEF DESCRIPTION OF THE DRAWINGS

FIG. 1 schematically shows a configuration of the electric griddle 100 according to the first embodiment.

FIG. 2 shows an exploded state of the electric griddle 100 of FIG. 1.

FIG. 3 is a sectional view taken along line A-A of FIG. 1.

FIG. 4 shows how to use the electric griddle 100.

5 shows schematically shows a configuration of the electric griddle 200 according to the second embodiment.

FIG. 6 shows an exploded state of the electric griddle 200 of FIG. 5.

FIG. 7 is a sectional view taken along line B-B of FIG. 5.

FIG. 8 shows how to use the electric griddle 200.

FIG. 9 schematically shows the configuration of the electric griddle 300.

FIG. 10 schematically shows the configuration of the electric griddle 400.

FIG. 11 schematically shows the configuration of the electric griddle 500.

FIG. 12 schematically shows the configuration of the electric griddle 600.

DETAILED DESCRIPTION OF THE INVENTION

The following gives a description of a suitable embodiment of the present invention with reference to the accompanying drawings. Constituent elements having substantially the same functional configuration are denoted by the same reference numerals and redundant explanations are omitted. In the following embodiments, an electric griddle will be described as an example of a heating and cooking apparatus, but the present invention is not limited to an electric griddle.

(First Embodiment)

A first embodiment of the present invention will be described. FIG. 1 is a diagram schematically showing a configuration of an electric griddle 100 according to this embodiment. FIG. 2 is a diagram showing a disassembled state of the electric griddle 100 of FIG. 1. FIG. 3 is an A-A sectional view of FIG. 1.

As shown in FIGS. 1 to 3, the electric griddle 100 according to this embodiment is mainly composed of an iron plate section 110 having a high thermal conductivity, a glass section 120 having a low thermal conductivity, a heating material 130 which is a heat source, a heat insulation mechanism 140, and an outer frame 150. The size of the electric griddle 100 may be optional. For example, the external dimensions (or external diameters) are about 50 to 60 cm for household use and 1 m or more for business use. However, in this embodiment, this point will be explained without distinction. Hereinafter, the constituent elements of the electric griddle 100 will be described in order.

(Iron Plate Section 110)

The iron plate section 110 is one example constituting the first area of the present invention and may be referred to as a heating area due to the properties described below. The iron plate section 110 constitutes a part of the cooking surface, and is heated by the heat from the heat generating section 130 described later. The iron plate section 110 is made of a material having a thermal conductivity higher than that of a glass section 120 described later, for example, a metal such as aluminum, stainless steel, or iron. The cooking surface side of the iron plate section 110 can be subjected to surface treatment. Still, the area actively heated in the cooking surface is referred to as an iron plate section, but it is an idiomatic expression (e.g. iron-plate cooking) used only for convenience of explanation. The material of the iron plate section 110 is not necessarily a steel material.

In the example shown in FIGS. 1 and 2, the shape of the iron plate section 110 is circular (infinite angular), but may be any shape. For example, may be polygon such as a triangle, a quadrangle, pentagon or a hexagon. In addition, if the number of people who use the electric griddle 100 is specified, the shape of the iron plate section 110 may be an n-sided polygon according to the number n of users. Further, the edge of the iron pate section 110 may have a swollen shape in order to prevent ingredients from being spilled out of the cooking surface.

As shown in FIGS. 1 and 2, the iron plate section 110 can be separated into four parts from 110a to 110d and these four parts 110a to 110d are the state of being joined together in use. It is convenient to divide the iron plate section into a plurality of parts 110a to 110d at the time of storing, caring for, or moving it. The number of parts is not limited to four and may be optional.

The type of the iron plate section 110 depends on the purpose. In addition to the flat type shown in FIGS. 1 to 3, various shapes such as deep-pan type, pancake type or Takoyaki (octopus dumplings) oven type can be used by exchanging them. The thickness, size, and the like of the iron plate section 110 can be the same as those of these general heating cooking apparatuses.

(Glass Section 120)

The glass section 120 is one example constituting the second area of the present invention and may be referred to as a non-heating area due to the properties described below. The glass section 120 has a lower thermal conductivity than the iron plate section 110 described above. That is, the thermal conductivity of glass is 1 watt per meter Kelvin (W/(m·K)) and the thermal conductivity of iron is 8 watts per meter Kelvin (W/(m·K)). Therefore, since the temperature rise of the glass section 120 is suppressed, containers such as glass and ceramic for food ingredients installation can be placed on the glass section 120. These containers can be used by exchanging various shapes such as a flat plate, a deep dish and a bowl.

The glass section 120 is configured as an area including the center part of the cooking surface. In the example shown in FIGS. 1 and 2 the shape of the glass section 120 is the same circular shape as that of the iron plate section 110, and the diameter thereof can be about ⅓ to ½ of the iron plate section 110. However, this is only an example, and the shape and size of the glass section 120 may be optional.

As shown in FIG. 1, the iron plate section 110 and the glass section 120 constitute a substantially flat surface when all the components are accommodated in the outer frame 150. In other words, the iron plate section 110 and the glass section 120 constituting the cooking surface can be flush with each other. Since the cooking surface is flat, when food ingredients are placed directly on the glass section 120, it is easy to move the ingredients to the iron plate section 110 and to cook them. It is easy to wash and take care of, too. Furthermore, it is also possible to move the ingredients to the glass section 120 to prevent them from excessive heating.

(Heating Material 130)

The heating material 130 generates heat due to electric power or the like supplied from the outside. Although the heating material 130 is schematically shown in FIG. 1, a specific configuration of the heating material 130 may be optional, for example, a heating wire may be used.

As shown in FIGS. 2 and 3, the heating material 130 has a shape matched to the shape of the iron plate 110. That is, the heating material 130 is disposed only in a part corresponding to the iron plate section 110. Heat is generated in the space between the heating material 130 and the iron plate 110 by the heating material 130, and then the cooking can be executed when the iron plate section 110 is heated.

As shown in FIG. 2, the heat generating section 130 can be separated into two parts 130a and 130b and these two parts 130a and 130b are the state of being joined together in use. Here, to achieve "the state of being joined together", these two parts may be combined by structural or mechanical means, or may simply be arranged in an adjacent state. It is convenient to be divided into a plurality of parts 130a and 130b for storage, care, or carrying of heat generating section 130. The number of parts is not limited to two and may be optional. Further, it may be the same as or different from the number of parts of the iron plate section 110 described above.

(Heat Insulation Mechanism 140)

As shown in FIG. 2 and FIG. 3, the heat insulating mechanism 140 is composed of a heat insulating material 142 disposed between the iron plate section 110 and the heating material 130, and the glass part 120, and a heat insulating material 144 disposed between the iron plate section 110 and the heating material 130, and the outer frame 150.

As shown in FIG. 3, the heat insulating material 142 insulates between the iron plate section 110 and the glass section 120 and between the glass section 120 and the heating material 130. On the other hand, the heat insulating material 144 insulates between the iron plate section 110 and the outer frame 150 and between the heating material 130 and the outer frame 150. Although the heat insulating material 144 is for protecting the outer frame 150 from heat, the heat insulating material 144 is not necessarily provided depending on the heat resistance of the outer frame 150.

The heat insulating materials 142 and 144 may be integrally formed with other components. Further, the heat insulating material 142 and 144 may be integrated (integrally formed).

As the material of the heat insulating materials 142 and 144, for example, Porextherm XPS (a registered trademark) of KROSAKI HARIMA CORPORATION can be adopted (http://krosaki-fc.com/wds/index.html). Its heat insulation performance is around 0.025 under an environment of 400 degrees Celsius and exceed that of air (http://krosaki-fc.com/wds/wds2.html).

A cooling mechanism is provided on a general electric griddle. As a cooling mechanism, an air cooling mechanism for convecting air is adopted. For this reason, in order to secure a sufficient air convection space, the total height of the electric griddle tends to be high. In the electric griddle 100 of this embodiment, by providing the heat insulating mechanism 140, it is not necessary to provide such an air convection type air cooling mechanism, or even if an air convection type air cooling mechanism is provided, air convection space can be kept small. Therefore, it is possible to lower the total height of the electric griddle 100 as compared with a general electric griddle. This makes it easy to use even for small children and elderly people by placing the electric griddle 100 on the table and easy for all the participants to cook.

In this embodiment, an example using a heat insulating material as a simple and preferable example of the heat insulating mechanism has been described, but the present invention is not limited thereto. As long as heat insulation can be realized, it is not necessarily limited to a mechanism using what is called a heat insulating material. For example, a mechanism using air (gas), water (liquid), gel and vacuum (reduced pressure) may be used.

(Outer Frame 150)

As shown in FIGS. 1 and 2, the outer frame 150 houses the iron plate section 110, the glass section 120, the heating material 130, the heat insulating mechanism 140 and the like described above at its inner side, and has a role as a shape holding function of the electric griddle 100. The outer frame 150 is made of metal or resin, for example. The outer shape of the outer frame 150 may conform to the shape of the iron plate section 110 as shown in FIGS. 1 and 2, or may have a different shape (polygonal shape, circular shape or the like) from the iron plate section 110.

As with the general electric griddle, necessary items can be provided on the outer frame 150, for example, a temperature adjustment switch, an air supply fan necessary for the air cooling mechanism, a current supply mechanism, a temperature adjustment measurement mechanism and a current supply mechanism to the air supply fan.

In addition, a lid as a cooking assisting utensil can be provided as with a general electric griddle, not shown in the figure. The lid can be made of metal, glass, resin, or the like. This lid may conform to the shape of the outer frame 150, the shape of the iron plate section 110 or the shape of the glass section 120.

The configuration of the electric griddle 100 in this embodiment has been described above. The following describes using method for the electric griddle 100.

As shown in FIG. 4, on the glass section 120 of the electric griddle 100, food ingredients and containers such as glass and ceramic for food ingredients installation can be placed. Since ingredients and the like are placed in the center part of the electric griddle 100, all the participants can easily cook. It is possible to prevent food ingredients and the like from being placed only in the hands of a specific person, to realize a situation in which many people can easily cook, and to produce a place for all-participating-type cooking.

Since the iron plate section 110 as the cooking surface and the glass section 120 are flush, it is easy to move food ingredients during cooking. In addition, since the temperature rise of the glass section 120 is suppressed, the glass section 120 is substantially in a non-heated state. For this reason, it is also possible to evacuate food that has been overheated from the iron plate section 110 to the glass section 10.

(Advantageous Effect of the First Embodiment)

As described above, according to this embodiment, by making the part of the cooking surface into a glass section 120 having a relatively low thermal conductivity and by providing a heat insulating material around the glass section 120 for heat insulation, temperature rise of the glass section 120 can be suppressed. This makes it possible to place dishes and bowls on which food ingredients and the like can be placed in the glass part 120, and to place food ingredients there directly. Thus, it is possible to prevent food ingredients and the like from being placed only in the hands of a specific person, to realize a situation in which many people can easily cook, and to produce a place for all-participating-type cooking.

In addition, by making the cooking surface circular shape and setting the glass section 120 as the area including a central part of the cooking surface, it is possible to place ingredients and the like in the center of the cooking surface so that all the participants can easily take and cook them.

Also, since the cooking surface can be separated into a plurality of surfaces, it can be conveniently divided into a plurality of parts at the time of storage, care, and carrying of the electric griddle 100.

(Second Embodiment)

A second embodiment of the present invention will be described. In this embodiment, differences from the first embodiment will be mainly described. FIG. 5 is a diagram schematically showing a configuration of an electric griddle 200 according to this embodiment. FIG. 6 is a diagram showing a disassembled state of the electric griddle 200 of FIG. 5. FIG. 7 is a B-B sectional view of FIG. 5.

As shown in FIGS. 5 to 7, the electric griddle 200 according to this embodiment is mainly composed of an iron plate section 210, a heating material 230 which is a heat source, a heat insulation mechanism 240, and an outer frame 250. Compared with the electric griddle 100 of the first embodiment, the electric griddle 200 of this embodiment has no glass section and the shapes of the heat insulating mechanism 240 and the outer frame 250 are different. Hereinafter, the constituent elements of the electric griddle 200 will be described in order.

Regarding the iron plate section 210 (composed of the four parts 210a to 210d) and the heating material 230 (composed of the two parts 230a and 230b), each of them can be substantially the same as the iron plate section 110 and the heating material 130 of the first embodiment. In this embodiment, since there is no structure corresponding to the glass section 120 of the first embodiment, the cooking surface is constituted only by the iron plate section 210. Therefore, the cooking surface has a donut shape having a hole H at the center of the iron plate section 210. The edge (both inside and outside) of the donut-shaped iron plate section 210 may have a swollen shape. in order to prevent ingredients from being spilled out of the cooking surface.

Hereinafter, the heat insulating mechanism 240 and the outer frame 250, which are characteristic features of this embodiment, will be described.

(Heat Insulating Mechanism 240)

As shown in FIGS. 6 and 7, the heat insulating mechanism 240 is composed of a heat insulating material 242 disposed between the iron plate section 210 and the heating material 230, and the hole H, and a heat insulating material 244 disposed between the iron plate section 210 and the heating material 230, and the outer frame 250. These heat insulating materials 242 and 244 may be integrally formed with other components. Further, the heat insulating materials 242 and 244 may be integrated (integrally formed).

As shown in FIGS. 6 and 7, the heat insulating materials 242 and 244 of the heat insulating mechanism 240 of this embodiment have a donut shape having holes H1 and H2 in the center. The donut-shaped holes H1 and H2 are formed to have substantially the same size as or smaller than the central part of the donut-shaped of the iron plate section 210.

(Outer Frame 250)

The outer frame 250 is made of metal or resin, for example. And as shown in FIGS. 5 and 6, the outer frame 250 houses the iron pate section 210, the heating material 230, the heat insulating mechanism 240, and the like described above at its inner side, and has a role as a shape holding function of the electric griddle 200. The outer shape of the outer frame 250 may conform to the shape of the iron plate section 210 as shown in FIGS. 5 and 6, or may have a different shape (polygonal shape, circular shape or the like) from the iron plate section 210.

As shown in FIGS. 6 and 7, the outer frame 250 of this embodiment have a donut shape having a hole H3 in the center. The donut-shaped hole H3 is formed to have substantially the same size as or smaller than the central part of the donut-shaped of the iron plate section 210.

As described above, the iron plate section 210, the heat insulating mechanism 240, and the outer frame 250 are formed in a donut shape, so that the central part of the electric griddle 200 is in a state of penetrating, as shown in FIGS. 5 and 7. In this part, it is possible to place containers such as glass and ceramic for food ingredients installation.

The configuration of the electric griddle 200 in this embodiment has been described above. The parts which are not described in this embodiment can be the same as those in the first embodiment. The following describes using method for the electric griddle 200.

The heat insulating mechanism 240 and the outer frame 250 are formed in a donut shape, so that the central part of the electric griddle 200 is in a state of penetrating, as shown in FIGS. 5 and 7. As shown in FIG. 8, container B such as glass and ceramic for food ingredients installation can be placed in the hole H section. Since ingredients and the like are placed in the center part of the electric griddle 200, all the participants can easily cook. It is possible to prevent food ingredients and the like from being placed only in the hands of a specific person, to realize a situation in which many people can easily cook, and to produce a place for all-participating-type cooking.

(Advantageous Effect of the Second Embodiment)

As described above, according to this embodiment by making the cooking surface into a doughnut shape and by shaping the central part of the cooking surface like a hollow shape, it is possible to place dishes and bowls on which food ingredients and the like can be placed in the center part of the cooking surface, and to place food ingredients there directly. Thus, it is possible to prevent food ingredients and the like from being placed only in the hands of a specific person, to realize a situation in which many people can easily cook, and to produce a place for all-participating-type cooking.

If the iron plate section 210 serving as a cooking surface has a donut shape, the entire electric griddle as shown in FIGS. 5 to 7 does not have to pass through in a donut shape. That is, it is not necessary to form the heat insulating material and the outer frame in a donut shape. In other words, the electric griddle 200 may simply be one obtained by removing the glass section 120 from the electric griddle 100 of the first embodiment.

Although preferred embodiments of the present invention have been described so far with reference to the accompanying drawings, it is obvious that the present invention should not be limited to these embodiments. It will be understood by those skilled in the art that variations and modifications may be made within the scope of the claims, and those variations and modifications will be within the technical scope of the present invention as a matter of course.

For example in the above embodiments, the cooking surface and the outer shape are circular, however, the present invention should not be limited to this embodiment. As shown in FIG. 9, the cooking surface and the outer shape may be a polygon such as a quadrangle, in the example of the electric griddle 300 shown in FIG. 9, the outer shape of the cooking surface is a quadrangle. Then, the glass section 320 as the second area (non-heating area) is formed into a band shape extending over the whole width and including the central part of the cooking surface, and is composed of three parts 320a to 320c. Furthermore, the upper and lower sections thereof are iron plate sections 310 as the first area (heating area), and are composed of two parts 310a and 310b.

FIGS. 10 and 11 illustrate other variations, in the electric griddle 400 of FIG. 10 the outer shape of the cooking surface is circular, the glass section 420 as the second area (non-heating area) is a quadrangle and the periphery thereof is the iron plate section 410 as the first area (heating area). In the electric griddle 500 of FIG. 11, the outer shape of the cooking surface is a quadrangle, the iron plate section 510 as the first area (heating area) is a cross shape including the central part of the cooking surface, and four glass sections 520 as second area (non-heating area) are provided around the iron plate section. As described above, the second area (non-heated area) is not necessarily an area including the center part of the cooking surface.

In the above embodiments, an example in which the iron plate section (the first area) and the glass section (the second area) are flush with each other has been described, however, the present invention should not be limited to this embodiment. As shown in the electric griddle 600 of FIG. 12, the glass section 620 as the second area (non-heating area) may be higher than the iron plate section 610 as the first area (heating area), or the part of the glass section 620 may be lower than the iron plate section 610. In addition, the shape of the iron plate section 610 or the glass section 620 is not limited to flat surface, but may be uneven surface.

In the above embodiments, it has been described that the cooking surface is composed of an iron plate section (first area) having high thermal conductivity and a glass section (second area) having low thermal conductivity, however, the present invention should not be limited to this embodiment. By providing a heat insulating mechanism between the first area and the second area and between the second area and the heat source, the temperature rise in the second area can be suppressed. Thus, the second area is not necessarily made of a material having relatively low thermal conductivity. For example, it is possible that the first area and the second area are made of the same material example the whole surface is an iron plate or a glass plate), or the second area is made of a material having a higher thermal conductivity than that of the first area (for example, an iron plate at the center and a glass plate at the periphery).

In the above embodiments, it has been described that the heat source is disposed only in a part corresponding to the iron plate section (the first area), however, the present invention should not be limited to this embodiment. For example, by providing a heat insulating material between the first area and the second area and between the second area and the heat source, the temperature rise in the second area can be suppressed. Thus, a heat source may be provided on the entire surface.

In the above embodiments, an example in which the iron plate section and the heat generating section can be separated into a plurality of surfaces has been described, however, the present invention should not be limited to this embodiment. Either or both of iron plate section and heat generating section may not be separable. Also, even when it can be separated, the number of separations can be optional. The number of separations of the iron plate sections and the heat generating section may be different.

In the above embodiment, various forms such as a circle and a polygon have been described as the shape of the cooking surface of the heating and cooking apparatus. The shape of the cooking surface of the heating and cooking apparatus may be matched with the shape of the table on which the apparatus is installed. For example, it is possible to install a heating and cooking apparatus having a hexagonal (n-polygonal) cooking surface or outer frame at the center of a hexagonal (n-polygonal) table, it can be used as a table for 6 people (for n people) at a restaurant such as Okonomiyaki restaurant and Yakiniku restaurant.

REFERENCE SIGNS LIST

100 Electric Griddle (first embodiment)
110 Iron Plate Section
120 Glass Section
130 Heating Material
140 Heat Insulating Mechanism
142 Heat Insulating Material
144 Heat Insulating Material
150 Outer Frame
200 Electric Griddle (second embodiment)
210 Iran Plate Section
230 Heating Material
240 Heat Insulating Mechanism
242 Heat insulating Material
244 Heat Insulating Material
250 Outer Frame
H1, H2, H3 Hole
B Container
300 Electric Griddle (third embodiment)
310 Iron Plate Section
320 Glass Section
400 Electric Griddle (fourth embodiment)
410 Iron Plate Section
420 Glass Section
500 Electric Griddle (fifth embodiment)
510 Iron Plate Section
520 Glass Section
600 Electric Griddle (sixth embodiment)
610 Iron Plate Section
620 Glass Section

The invention claimed is:
1. A heating apparatus comprising;
a) a first member, the first member having an outer shape, the outer shape having a central part;
b) a second member made of the same or different material as the first member, the second member having a top surface disposed opposite a bottom surface;
c) a heat source for heating the first member, the heat source having a top surface disposed opposite a bottom surface; wherein the first member being positioned at a fixed vertical distance from the top surface of the heat source;
d) an outer frame that houses the first member, the second member, and the heat source;
e) a first heat insulating mechanism provided between the second member, and the first member and the heat source; and
f) a second heat insulating mechanism provided between the bottom surface of the second member, the bottom surface of the heat source, the first member and the heat source, and the outer frame.

2. The heating and cooking apparatus according to claim 1, wherein the heat source is disposed only in a part corresponding to the first member.

3. The heating and cooking apparatus according to claim 1, wherein the first member and the second member are flush with each other.

4. The heating and cooking apparatus according to claim 1, wherein the outer shape of the first member is a polygonal shape or a circular shape and the second member is disposed in a part including the central part of the outer shape of the first member.

5. The heating and cooking apparatus according to claim 1, wherein the first member comprises a plurality of separable surfaces.

6. The heating and cooking apparatus according to claim 2, wherein the first member and the second member are flush with each other.

7. The heating and cooking apparatus according to claim 2, wherein the outer shape of the first member is a polygonal shape or a circular shape and the second member is disposed in a part including the central part of the outer shape of the first member.

8. The heating and cooking apparatus according to claim 3, wherein the outer shape of the first member is a polygonal shape or a circular shape and the second member is disposed in a part including the central part of the outer shape of the first member.

9. The heating and cooking apparatus according to claim 6, wherein the outer shape of the first member is a polygonal shape or a circular shape and the second member is disposed in a part including the central part of the outer shape of the first member.

10. The heating and cooking apparatus according to claim 2, wherein the first member comprises a plurality of separable surfaces.

11. The heating and cooking apparatus according to claim 3, wherein the first member comprises a plurality of separable surfaces.

12. The heating and cooking apparatus according to claim 6, wherein the first member comprises a plurality of separable surfaces.

13. The heating and cooking apparatus according to claim 4, wherein the first member comprises a plurality of separable surfaces.

14. The heating and cooking apparatus according to claim 7, wherein the first member comprises a plurality of separable surfaces.

15. The heating and cooking apparatus according to claim 8, wherein the first member comprises a plurality of separable surfaces.

16. The heating and cooking apparatus according to claim 9, wherein the first member comprises a plurality of separable surfaces.

* * * * *